United States Patent
Yamashita et al.

(10) Patent No.: US 7,637,089 B2
(45) Date of Patent: Dec. 29, 2009

(54) GRASS COLLECTING APPARATUS FOR LAWN MOWER

(75) Inventors: Nobuyuki Yamashita, Izumi (JP); Takashi Fujii, Sakai (JP); Hiroaki Kitaguchi, Takaishi (JP); Toshiki Kanai, Sakai (JP); Katsuhiko Uemura, Sakai (JP); Tomoyuki Morikawa, Takatsuki (JP); Hiroki Nagai, Sakai (JP); Ryouzou Imanishi, Kishiwada (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/203,311

(22) Filed: Sep. 3, 2008

(65) Prior Publication Data

US 2009/0211215 A1 Aug. 27, 2009

(30) Foreign Application Priority Data

Feb. 26, 2008 (JP) .............................. 2008-044574
Mar. 12, 2008 (JP) .............................. 2008-062602

(51) Int. Cl.
*A01D 43/00* (2006.01)
(52) U.S. Cl. ........................................................ 56/202
(58) Field of Classification Search .................. 56/16.6, 56/199, 202, 203, 5, 194
See application file for complete search history.

(56) References Cited

U.S. PATENT DOCUMENTS 4,903,469 A * 2/1990 Murakawa et al. ............ 56/202
6,226,970 B1 * 5/2001 Busboom et al. ............... 56/202
7,263,819 B2 9/2007 Samejima et al.

FOREIGN PATENT DOCUMENTS

JP 2005278573 10/2005

* cited by examiner

*Primary Examiner*—Robert E Pezzuto
(74) *Attorney, Agent, or Firm*—The Webb Law Firm (57) ABSTRACT

A grass collecting apparatus for a lawn mower comprises a frame (22) supported by a vehicle body, a container supporting member (26) for supporting a grass collecting container (21) for storing grass clippings and including a container supporting surface (27) for receiving an opening edge of the grass collecting container, and a container cover (23) mounted on the frame to be oscillatable about a horizontal axis between a closed position and an opened position. An engaging member (35) is mounted on the container cover (23). The engaging member (35) is engageable with the opening edge (21b) of the grass collecting container (21) with oscillation of the container cover (23) from the opened position to the closed position, thereby positioning and maintaining the grass collecting container (21) on the container supporting member (26), and disengageable from the opening edge (21b) of the grass collecting container (21) with oscillation of the container cover (23) from the closed position to the opened position.

6 Claims, 11 Drawing Sheets

GRASS COLLECTING APPARATUS FOR LAWN MOWER

BACKGROUND OF THE INVENTION

1. Field of the Invention

The present invention relates to a grass collecting apparatus for a lawn mower comprising a frame supported by a vehicle body, a container supporting member for supporting a grass collecting container for storing grass clippings and including a container supporting surface for receiving an opening edge of the grass collecting container, and a container cover mounted on the frame to be oscillatable about a horizontal axis between a closed position and an opened position. The container cover is adapted to cover an opening of the grass collecting container supported by the container supporting member when in the closed position and open the opening when in the opened position.

2. Description of the Related Art

A grass collecting apparatus for a lawn mower comprising a container frame, right and left grass collecting containers and a container cover is known from Japanese Unexamined Patent Application Publication No. 2005-278573 (see paragraph 0023 to 0026; FIGS. 7 to 8). With this grass collecting apparatus, the right and left grass collecting containers each include a fabric material sewn to a rectangular-bag shape, a through hole formed along an upper end opening edge of the bag-shaped fabric material, and a core frame inserted into the through hole. The core frame forms a rectangular opening edge of the grass collecting container. The container frame includes a cross frame member and four supporting arms extending rearward from the cross frame member. The container frame supports an opening edge of the grass collecting portion as placed on top surfaces of the two supporting arms and the cross frame member The container cover is pivotably supported by the container frame through hinge elements to be vertically oscillatable for opening and closing. The grass collecting apparatus further comprises an engaging member projecting from a front edge central portion of the core frame of the grass collecting container, and a fixed seal plate secured to the cross frame of the container frame and having an opening. The engaging member is inserted into this opening to be engaged with the cross frame thereby restraining the grass collecting container from being displaced on the container frame.

When the grass collecting container is positioned relative to the container supporting member by the conventional engaging member and the opening in this conventional grass collecting apparatus, the grass collecting container is difficult to remove from the container supporting member More particularly, with the positioning mechanism formed of the engaging member and the opening as noted above, when the grass collecting container is removed from the container supporting member, the grass collecting container engaged by the engaging member is disengageable from the container supporting member only by lifting the grass collecting container from the container supporting surface. However, when the grass collecting container is heavy due to collected grass clippings, the grass collecting container is hard to lift, and thus increases a burden of a disengaging operation of the grass collecting container relative to the container supporting member.

SUMMARY OF THE INVENTION

The object of the present invention is to provide a grass collecting apparatus for a lawn mower, which allows a grass collecting container to be easily positioned relative to a container supporting member, and facilitates removal of the grass collecting container.

In order to achieve the above-noted object, a grass collecting apparatus for a lawn mower in accordance with the present invention comprises a frame supported by a vehicle body, a container supporting member for supporting a grass collecting container for storing grass clippings and including a container supporting surface for receiving an opening edge of the grass collecting container, a container cover mounted on the frame to be oscillatable about a horizontal axis between a closed position and an opened position, and an engaging member mounted on the container cover. The container cover covers an opening of the grass collecting container supported by the container supporting member when in the closed position and opens the openings when in the opened position. Further, the engaging member is engageable with the opening edge of the grass collecting container with oscillation of the container cover from the opened position to the closed position, thereby positioning and maintaining the grass collecting container on the container supporting member, and disengageable from the opening edge of the grass collecting container with oscillation of the container cover from the closed position to the opened position.

With this construction, when the container cover is switched to the lower closed position, the engaging member is oscillated and displaced together with the container cover to engage the opening edge of the grass collecting container for positioning the grass collecting container. On the other hand, when the container cover is switched to the upper opened position, the engaging member is oscillated and displaced together with the container cover to disengage upward from the opening edge of the grass collecting container to cancel the positioning of the grass collecting container. Thus, it is possible not only to position the grass collecting container relative to the container supporting member by the positioning action of the engaging member, thereby restraining displacement of the grass collecting container, but also to disengage the engaging member in one operation by switching the container cover to the upper opened position. In addition, when the grass collecting container is removed from the container supporting member, no special operation is required for canceling the positioning of the grass collecting container by the engaging member.

According to one of the preferred embodiments of the present invention, the frame extends rearward from the vehicle body, the container supporting surface extends in a fore-and-aft direction of the vehicle body to allow the grass collecting container to slide on the container supporting surface in the fore-and-aft direction of the vehicle body, and the engaging member is adapted to position the grass collecting container in the fore-and-aft direction of the vehicle body. Further, the container supporting member includes a slide guide for guiding slide movement of the grass collecting container along the container supporting surface. With this characteristic feature, when the positioning of the grass collecting container by the engaging member is canceled, the grass collecting container is guided by the slide guide and moved along the container supporting surface by pulling the grass collecting container rearward of the grass collecting apparatus. As a result, the grass collecting container can be detached while its weight is borne by the container supporting member.

In order to realize the oscillation of the container cover and the positioning and maintaining of the grass collecting container with a simple construction, one of the preferred embodiments of the present invention provides the apparatus in which the container cover is attached to the frame through a connecting member to be oscillatable about the horizontal axis, and the engaging member is formed on the connecting member. With this construction, the positioning function for the grass collecting container and the oscillating function for the container cover can be realized only by the connecting member.

Other features and advantages of the present invention will be apparent from the description of the preferred embodiments given below with reference to the accompanying drawings.

DETAILED DESCRIPTION OF THE PREFERRED EMBODIMENTS

Figure 1:
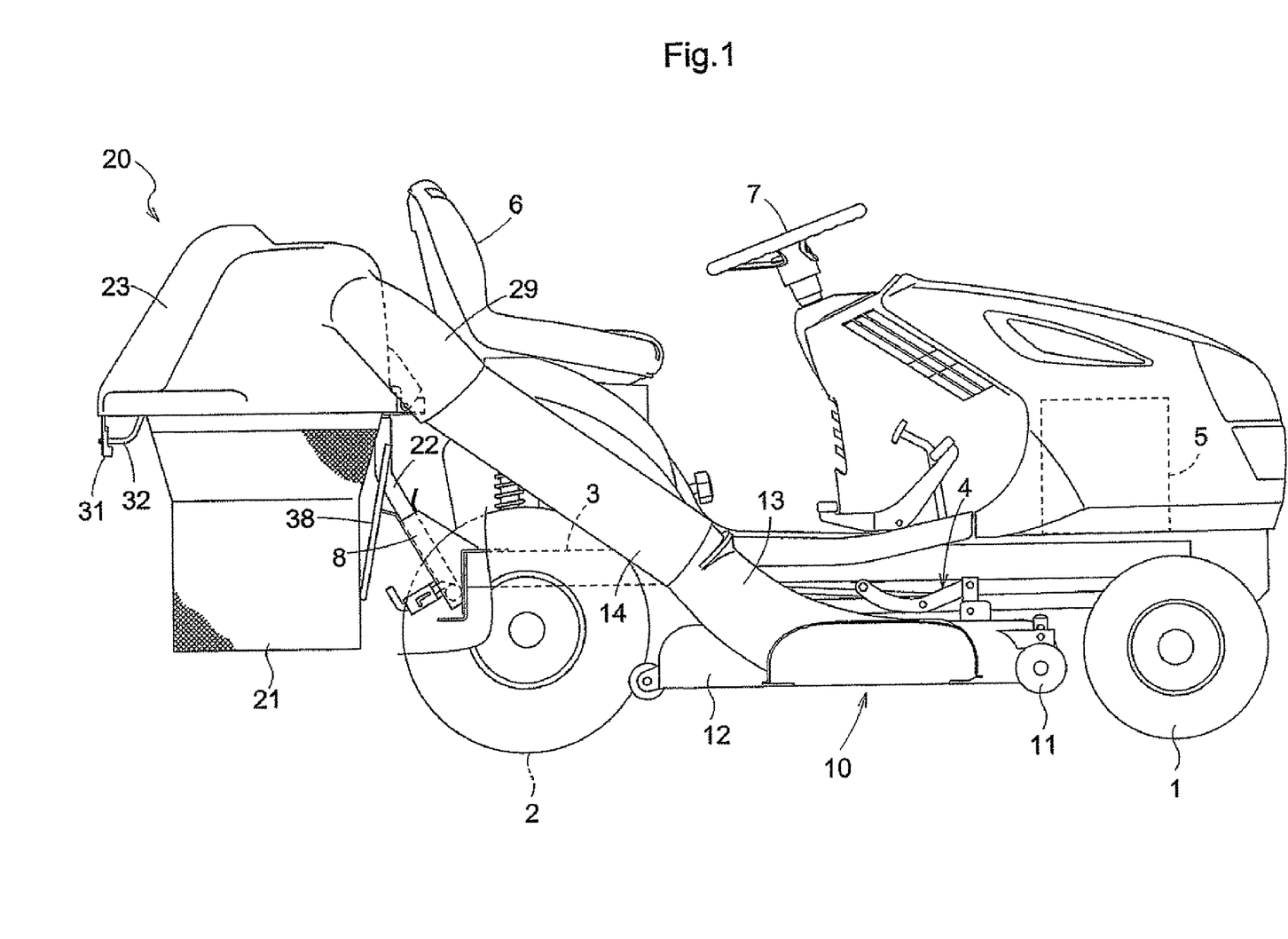
FIG. 1 is a side elevation of a lawn mower.
Figure 2:
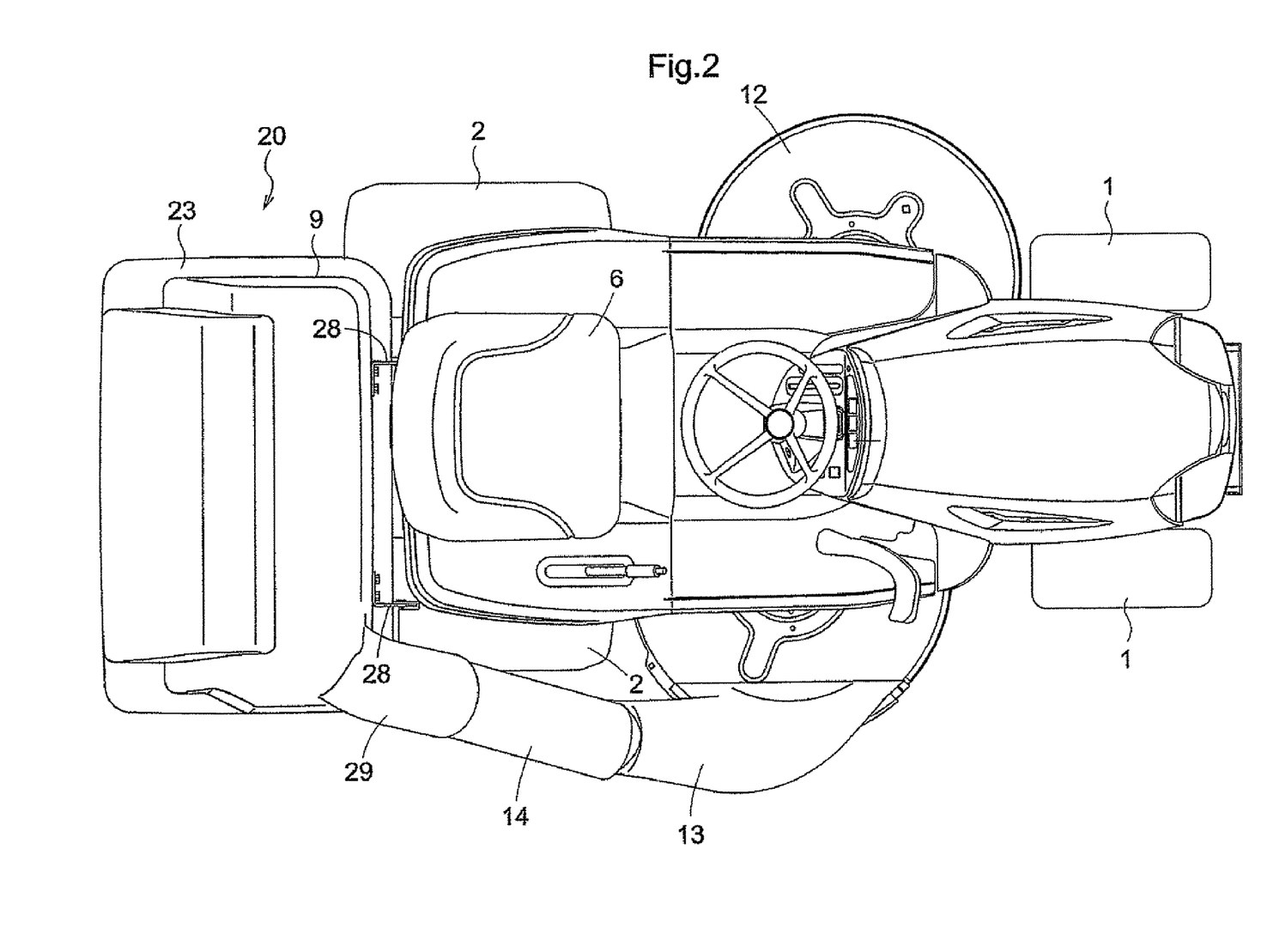
FIG. 2 is a top plan view of the lawn mower.

The present invention will be described hereinafter with reference to the accompanying drawings FIG. 1 is a side elevation of a lawn mower. FIG. 2 is a top plan view of the lawn mower. As shown in the drawings, the lawn mower comprises a self-propelled vehicle having a right and left pair of dirigible front wheels 1 and a right and left pair of driven rear wheels 2, a mower unit 10 connected to a vehicle frame 3 through a link mechanism 4 between the front wheels 1 and rear wheels 2, and a grass collecting apparatus 20 relating to the present invention and mounted rearwardly of the vehicle.

This lawn mower is designed for performing mowing operations.

More particularly, in addition to the front wheels 1 and rear wheels 2, the self-propelled vehicle further comprises a motor section including an engine 5 mounted forwardly of a vehicle body, and a riding-type driver's section having a driver's seat 6 mounted rearwardly of the vehicle body and a steering wheel 7 provided forwardly of the driver's seat 6. The self-propelled vehicle transmits output from the engine 5 to the mower unit 10 as well as the rear wheels 2.

The link mechanism 4 is vertically oscillated relative to the vehicle frame 3, thereby vertically moving the mower unit 10 between a lower operative position with a ground gauge wheel 11 contacting the ground and an upper inoperative position with the ground gauge wheel 11 raised from the ground.

Figure 3:
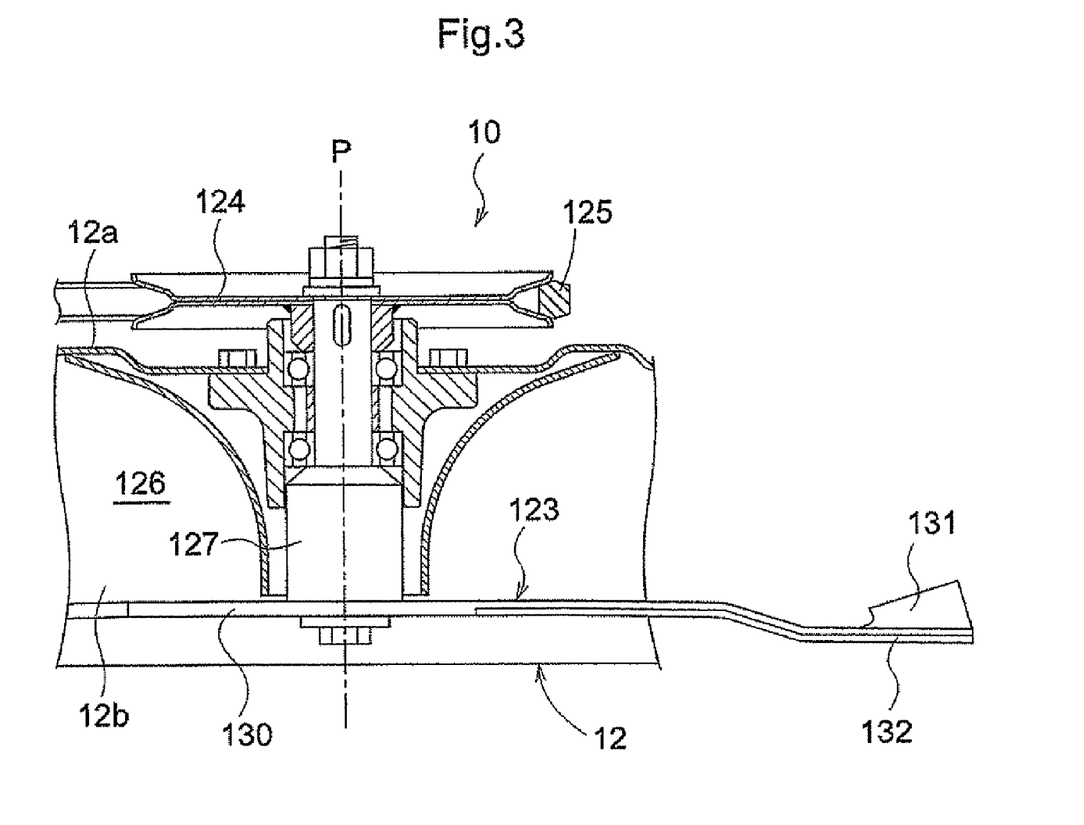
FIG. 3 is a vertical sectional view of a central portion of a mower unit.

As shown in FIG. 3, the mower unit 10 includes a mower housing 12, a plurality of cutter blades 123, and an input belt 124 and a blade driving belt 125 arranged above a top surface of the mower housing 12.

Each of the cutter blades 123 is provided in one of a plurality of cutting chambers 126 arranged in the interior of the mower housing 12 side by side transversely of the vehicle, and rotatably supported by a top plate 12a of the mower housing 12 through a rotary support shaft 127 fixed to a pulley 124. Each of the cutting chambers 126 is defined by the top plate 12a and a side wall 12b of the mower housing 12 and a guide plate (not shown) attached to the interior of the mower housing 12, and has a generally circular shape as viewed from top and bottom. The side wall 12b of the mower housing 12 and the guide plate form a side wall portion of the cutting chamber 126.

Each cutter blade 123 provided in one of the cutting chambers 126 includes a blade body 130 rotatably supported in unison with the rotary support shaft 127 at a longitudinally middle portion thereof, and fan vanes 131 extending from opposite distal end portions of the blade body 130 rearward in a rotating direction of the blade body 130. The blade body 130 has an edge portion 132 provided in each of the opposite distal end portions of the blade body 130 at one end thereof in a width direction, i.e. provided forwardly of the rotating direction of the blade body 130.

Figure 4:
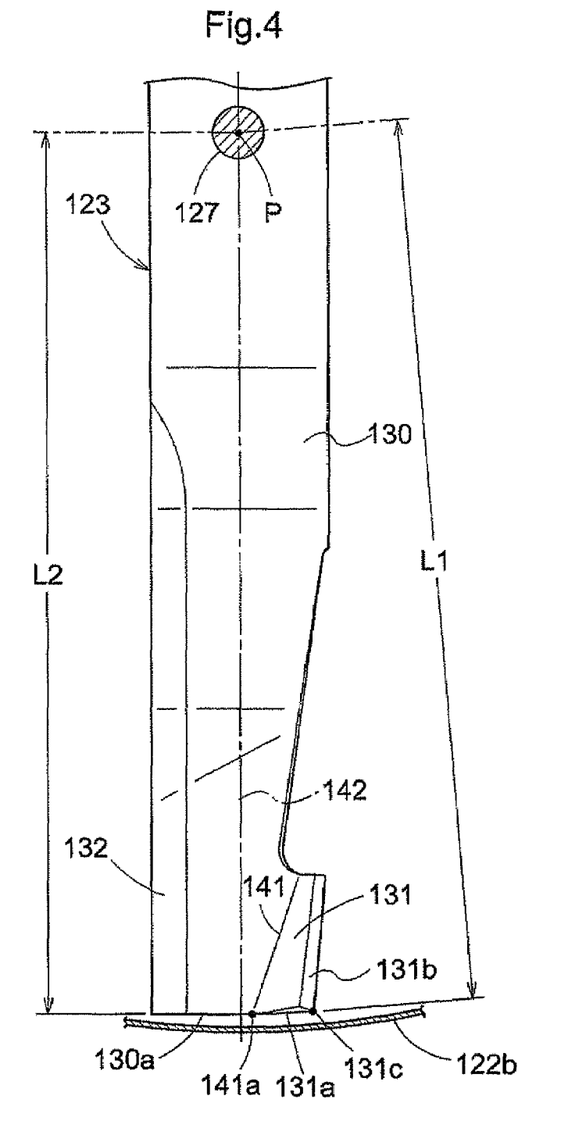
FIG. 4 is a top plan view of a cutter blade at one end thereof.
Figure 5:
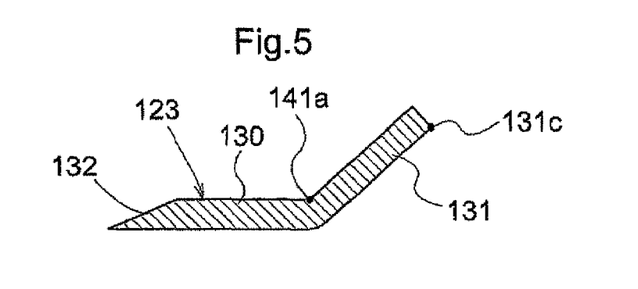
FIG. 5 is a side view of the cutter blade.

Next, the shape of the cutter blade 123 will be described in detail. FIG. 4 is a top plan view of the cutter blade 123 at one end thereof. FIG. 5 is a side view of the cutter blade 123. As shown in FIGS. 4 and 5, the cutter blade 123 comprises a single bent plate formed to allow each of the vanes 131 provided in the opposite distal end portions of the blade body 130 to rise at a crease 141 from the blade body 130. More particularly, the vane 131 provided in each of the opposite distal end portions of the blade body 130 is bent and raised at the crease 141 from the blade body 130 to project from the blade body 130 upward, and rearward in the width direction of the blade body 130 (in a direction pointing rearward in the rotating direction of the blade body 130).

The crease 141 of each vane 131 extends to have one end 141a thereof located at a distal end 130a of the blade body 130, and inclines relative to a center line 142 of the blade body 130 in the width direction lie closer to the center line 142 toward the distal end of the blade body. A gap between the side wall 12b and the guide plate acting as the side wall portion of the cutting chamber 126 and the vane 131 is small so that air currents generated by the vane 131 are less likely to leak. The distal end 130a of the blade body 130 is straight along the width direction of the blade body 130. More particularly, each vane 131 provided in the opposite distal end portion of the blade body 130 has a point of intersection 131c of a lateral side 131a facing the side wall portion of the cutting chamber 126 with an end side 131b extending from the blade body 130. A distance L1 from the point of intersection 131c to a rotational axis P of the blade body 130 is equal to a distance L2 from the distal end 130a of the blade body 130 to the rotational axis P of the blade body 130.

This shape of the cutter blade 123 reduces air leakage through the gap between the vane 131 and the side wall 12b of the cutting chamber to allow the air currents generated by the vane 131 to work efficiently. Further, an air current generating surface of the vane 131 is enlarged to achieve an excellent air blowing performance.

When the self-propelled vehicle is propelled with the mower unit 10 being in the lower operative position, the mower unit 10 performs a mowing operation by the cutter blades 123 rotating in the interior of the mower housing 12, thereby directing grass clippings to a transport duct 14 from a discharge tube 13 positioned at one lateral side of the mower housing 12, with carrier air currents generated by rotation of the cutting blades, to be supplied to a grass collecting apparatus 20. The grass collecting apparatus 20 collects and accumulates the grass clippings from the transport duct 20 in a right and left pair of grass collecting containers 21.

Figure 6:
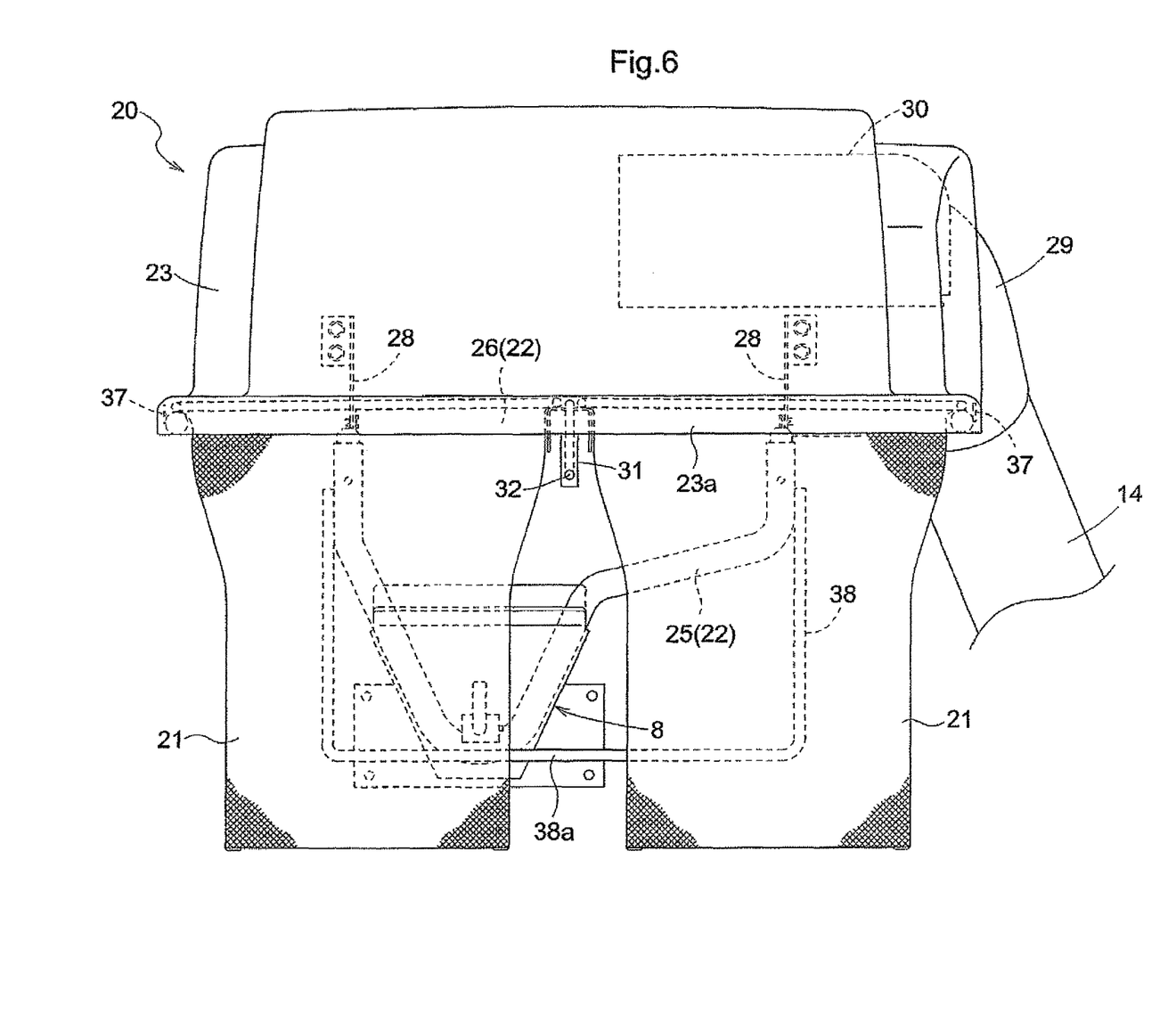
FIG. 6 is rear view of a grass collecting apparatus.
Figure 8:
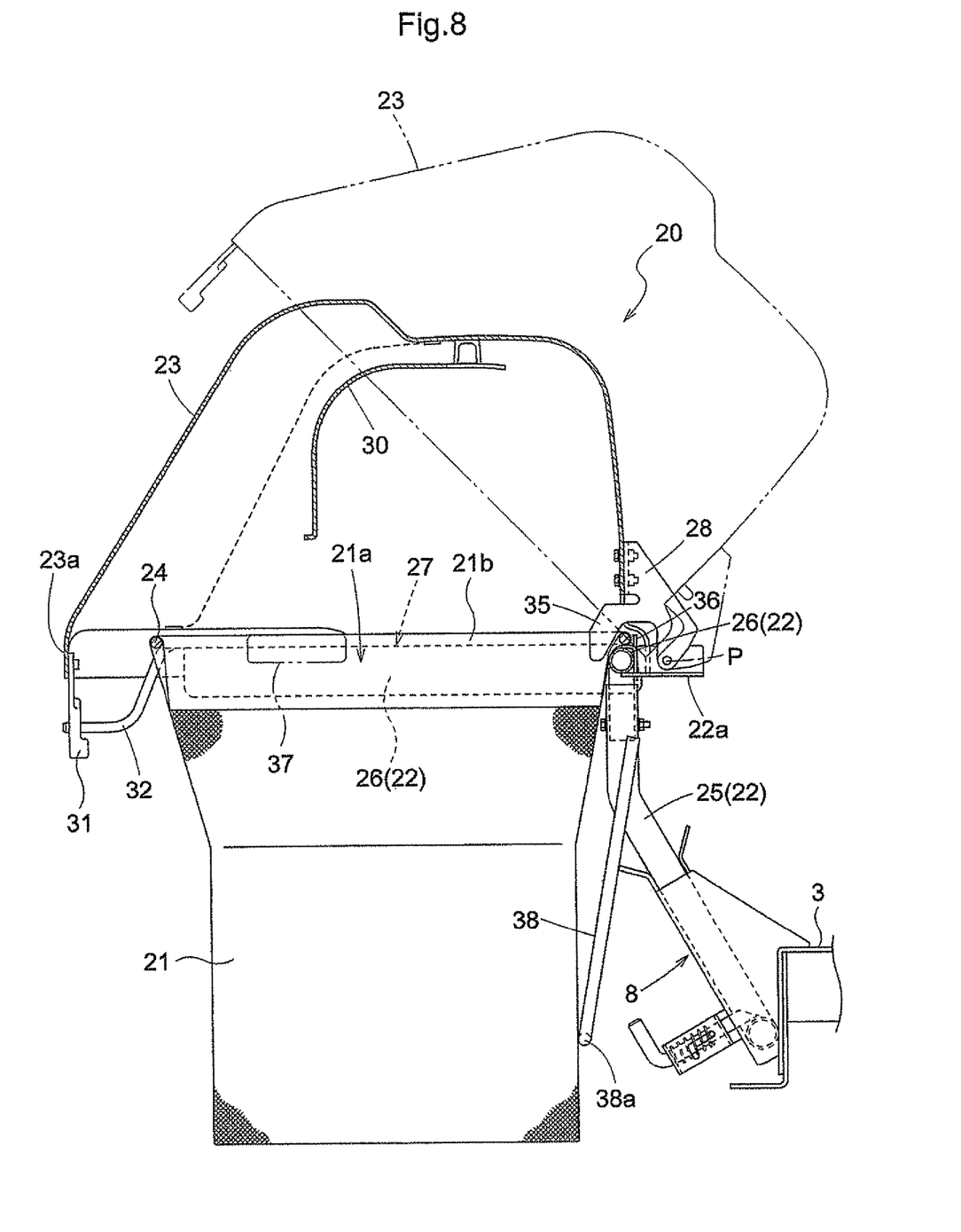
FIG. 8 is a vertical side view of the grass collecting apparatus.

The grass collecting apparatus 20 will be described in detail. FIG. 6 is a rear view of the grass collecting apparatus 20. FIG. 8 is a vertical side view of the grass collecting apparatus 20. As shown in the drawings, in addition to the right and left pair of grass collecting containers 21, the grass collecting apparatus 20 includes a container frame 22 connected to a rear portion of the vehicle frame 3 through a connecting device 8 for supporting the right and left grass collecting containers 21, and a container cover 23 supported at an upper edge side of the container frame 22.

Figure 7:
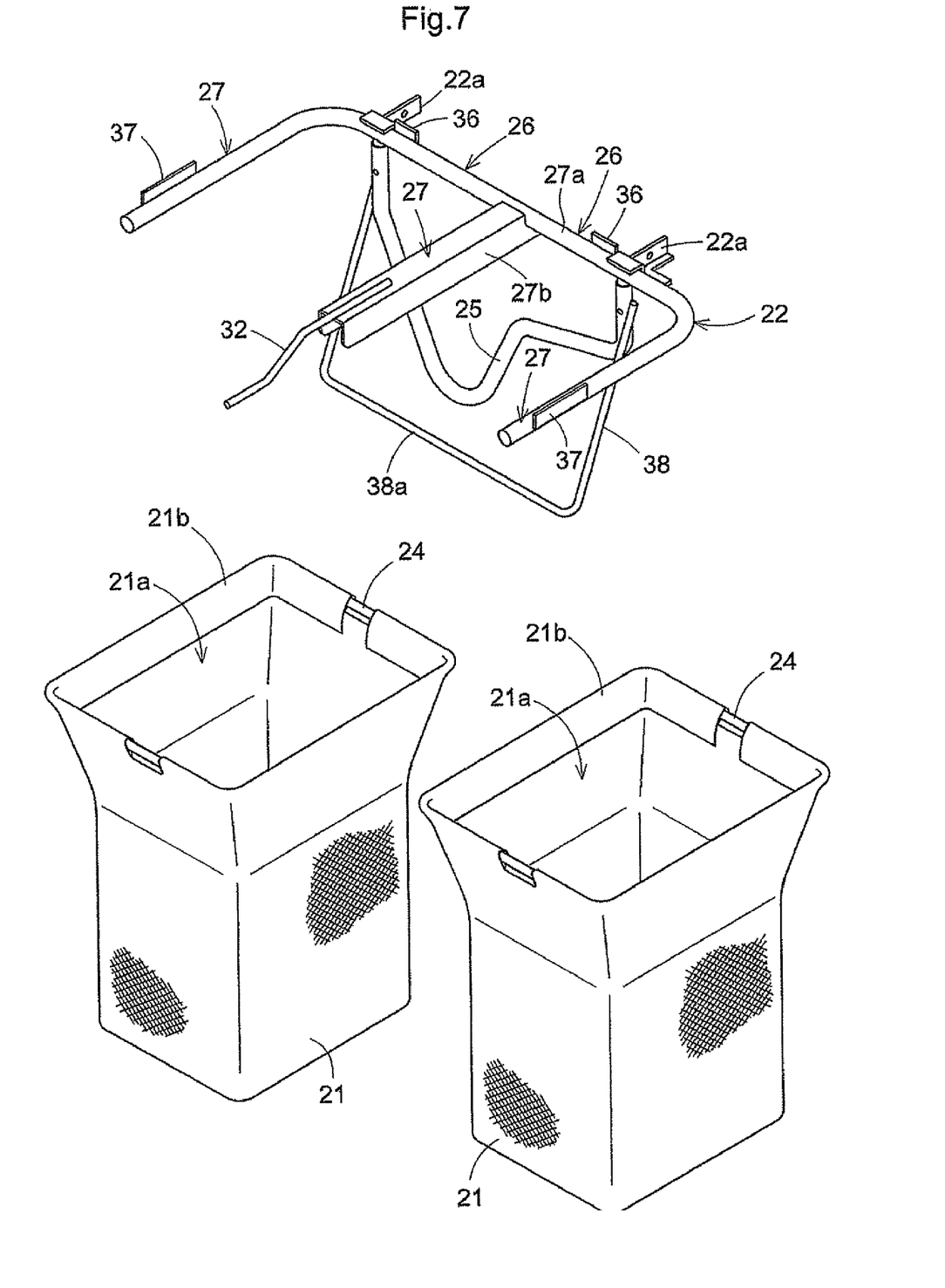
FIG. 7 is a perspective view of grass collecting containers and a container supporting member.

As shown in FIG. 7, each of the grass collecting containers 21 is made of an air-permeable fabric material sewn to form a rectangular tube. The grass collecting container 21 has an opening 21a provided at an upper end thereof to open upward. The opening 21a is an opening for receiving and discharging the grass clippings and is maintained in a rectangular shape by an opening frame 24.

Figure 9:
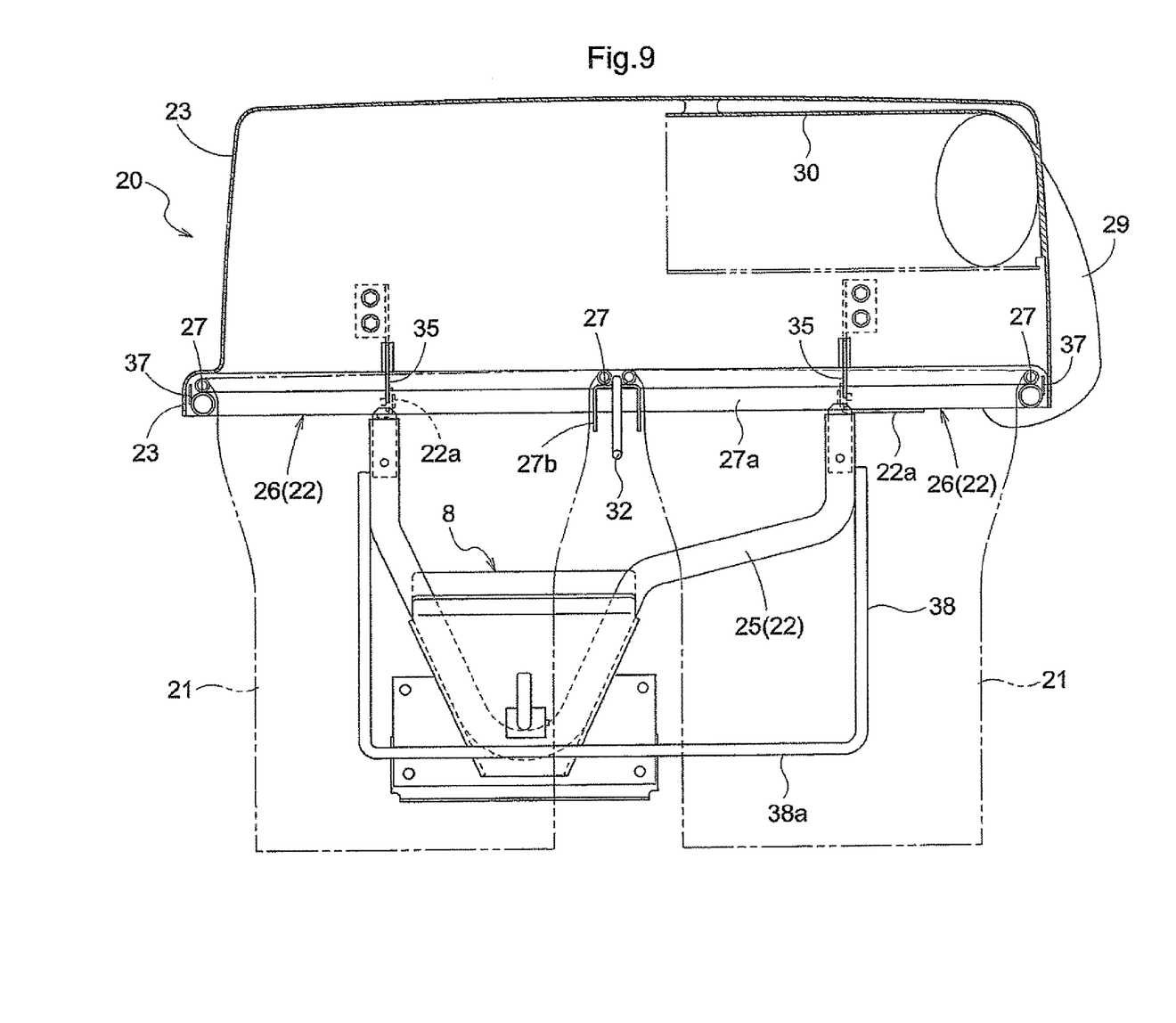
FIG. 9 is a rear view of a container frame.

As shown in FIGS. 8 and 9, the container frame 22 includes a strut 25 connected at a lower end thereof to the connecting device 8, and a right and left pair of container supporting members 26 provided at upper end portions of the strut 25. Each container supporting member 26 suspends and supports one of the grass collecting containers 21.

Figure 10:
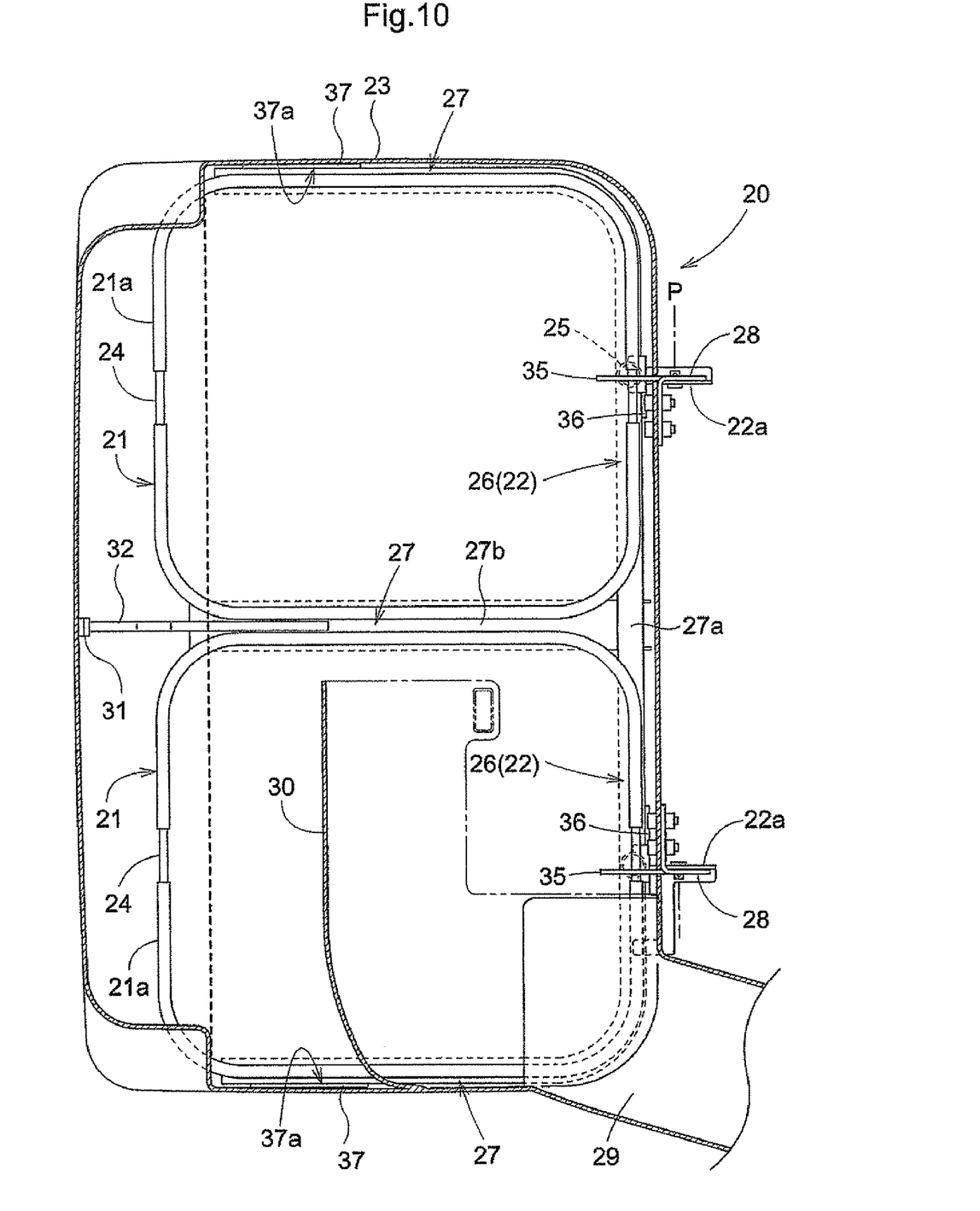
FIG. 10 is a top plan view of the container supporting member.

More particularly, as shown in FIGS. 8, 9 and 10, each container supporting member 26 is formed of a portion extending in a fore-and-aft direction of the grass collecting apparatus and a portion extending in a transverse direction of the grass collecting apparatus, of a bent pipe member 27a connected to the upper end of the strut 25, and a portion of a bent sheet metal member 27b extending rearward of the grass collecting apparatus from the transversely extending portion of the bent pipe member 27a. Thus, each container supporting member 26 is U-shaped construction opening rearward of the grass collecting apparatus.

Each container supporting member 26 has a container supporting surface 27 facing upward of the apparatus, which is defined by upper end surfaces of the bent pipe member 27a and the bent sheet metal member 27b. An upper end portion of the grass collecting container 21 is inserted between the bent pipe member 27a and the bent sheet metal member 27b to allow the opening edge of the grass collecting container 21 to be placed on and supported by the container supporting surface 27.

The container cover 23 is formed of a resin material. This container cover 23 is pivotably supported by support elements 22a of the container frame 22 through a right and left pair of plate-type connecting metal attachments 28 mounted on lower front end portions of the cover 23 and acting as connecting members. The container cover 23 is vertically oscillatable about an open/close axis P extending transversely of the apparatus provided in the connecting metal attachments 28 between the lower closed position and upper opened position.

The container cover 23 shown in solid lines in FIG. 8 represents the container cover in the lower closed position. As shown in the drawings, the container cover 23 is pivoted about the open/close axis P rearward of the apparatus to descend relative to the container frame 22. When a lower end portion 23a (flange portion) of the container cover 23 is positioned peripherally of the right and left pair of container supporting members 26, the container cover 23 assumes the lower closed position. In this state, the container cover 23 covers the openings 21a of the grass collecting containers 21 supported by the right and left pair of container supporting members 26 to restrain the grass collecting containers 21 from moving up from the container supporting members 26 by stopper action of a horizontal plate portion 23b (see FIG. 11A) of the lower end portion 23a relative to the opening edges 21b of the grass collecting containers 21. Further, the grass clippings are supplied to the interior of the cover 23 from the transport duct 14 through an introducing tube 29 associated with one end in the transverse direction of the grass collecting apparatus, and the container cover 23 directs and dumps the grass clippings in the openings 21a of the right and left grass collecting containers 21. At this time, the container cover 23, with an airguide plate 30 (see FIGS. 8 and 9) provided on the inner surface thereof, guides the grass clippings from the introducing tube 29 toward the grass collecting container 21 located away from the side where the introducing tube 29 is provided. The air-guide plate 30 is made simultaneously with forming of the resin material for the container cover 23, and formed integrally with the container cover 23.

As shown in FIG. 8, when the container cover 23 is brought to the lower closed position, a latch 31 provided in a free end of the container cover 23 is engaged with a lock arm 32 extending from the bent metal plate member thereby securing the container cover 23 to the lower closed position.

The container cover 23 shown in two-dot chain lines in FIG. 8 is in the upper opened position. As shown in the drawings, when the container cover 23 is pivoted about the open/close axis P to ascend to allow the connecting metal attachments 28 to be supported by the support elements 22a, the container cover 23 assumes the upper opened position. Then, the container cover 23 opens areas above the right and left container supporting members 26 so that the grass collecting containers 21 may be removed from the container supporting members 26.

As shown in FIGS. 8, 6 and 7, the container cover 23 has a right and left pair of engaging members 35 provided at lower front portions of the container cover 23. Each engaging member 35 is a hook element formed integrally with one of the connecting metal attachments 28.

Figure 11A:
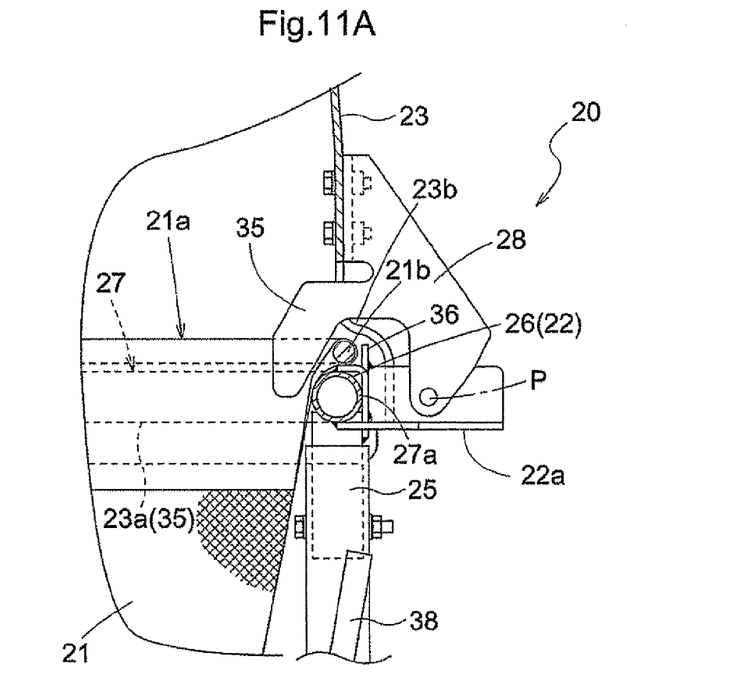
FIG. 11A is a side view of an engaging portion in an operative position.

FIG. 11A is a side view of the engaging member 35 in the operative position. As shown in the drawings, when the container cover 23 is switched to the lower closed position, the engaging member 35 moves over the opening edge 21b of the grass collecting container 21 attached to the container supporting member 26 to allow a distal end of the engaging member 35 to be positioned at the opening edge 21b rearward of the vehicle to assume the operative position in which the engaging member 35 is engaged with the opening edge 21b. In this position, the engaging member 35 holds the opening edge 21b of the grass collecting container 21 in the fore-andaft direction of the grass collecting apparatus, in cooperation with a stopper 36 provided on the bent pipe member 27a, whereby the engaging member 35 and stopper 36 position the grass collecting container 21 relative to the container supporting member 26 in the fore-and-aft direction of the apparatus to restrain the grass collecting container 21 from being displaced from the container supporting member 26 in the foreand-aft direction of the apparatus.

Figure 11B:
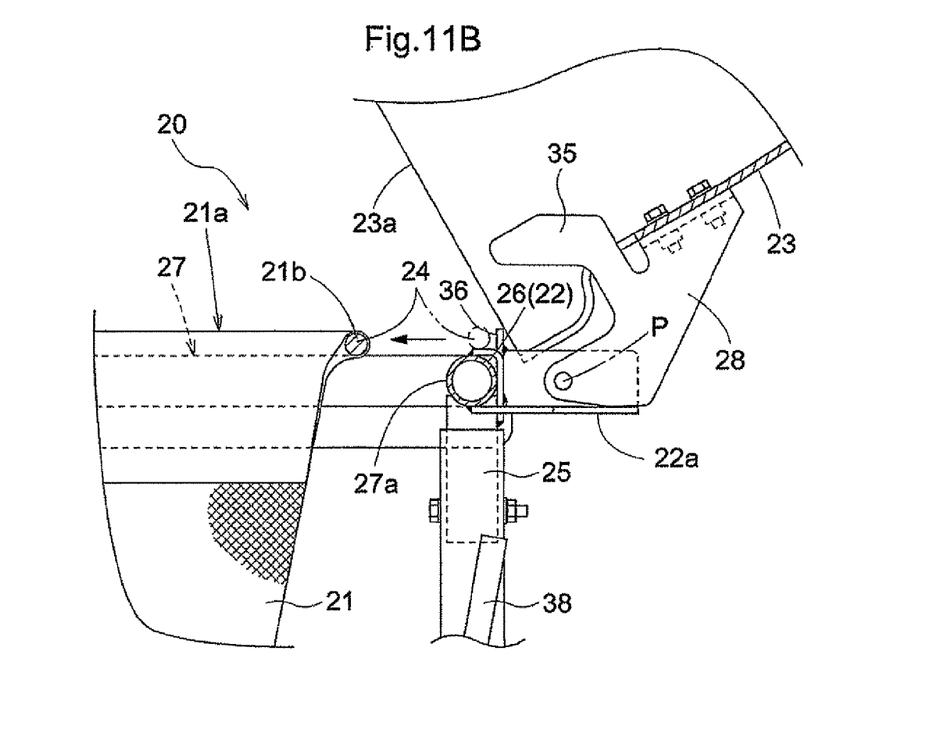
FIG. 11B is a side view of the engaging portion in a release position.

FIG. 11B is a side view of the engaging member 35 in the release position. As shown in the drawings, when the container cover 23 is switched to the upper opened position, the engaging member 35 is moved up out of disengagement from the opening edge 21b of the grass collecting container 12 to assume the release position. In this position, the engaging member 35 cancels the positioning of the grass collecting container 21 to allow the grass collecting container 21 to be removed from the container supporting member 26.

As shown in FIGS. 6 and 7, each container supporting member 26 has a slide guide 37 provided on a lateral side portion of the container supporting surface 27 by being attached to the portion extending in the fore-and-aft direction of the apparatus, of the bent pipe member 27a forming the container supporting surface 27.

The slid guide 37 serves to guide the opening edge 21b of the grass collecting container 21 to prevent the opening edge 21b of the grass collecting container 21 from disengaging from the container supporting surface 27 when the grass collecting container 21 is pulled out of the container supporting member 26 rearward of the grass collecting apparatus, thereby allowing the grass collecting container 21 to move on the container supporting surface 27.

Figure 12:
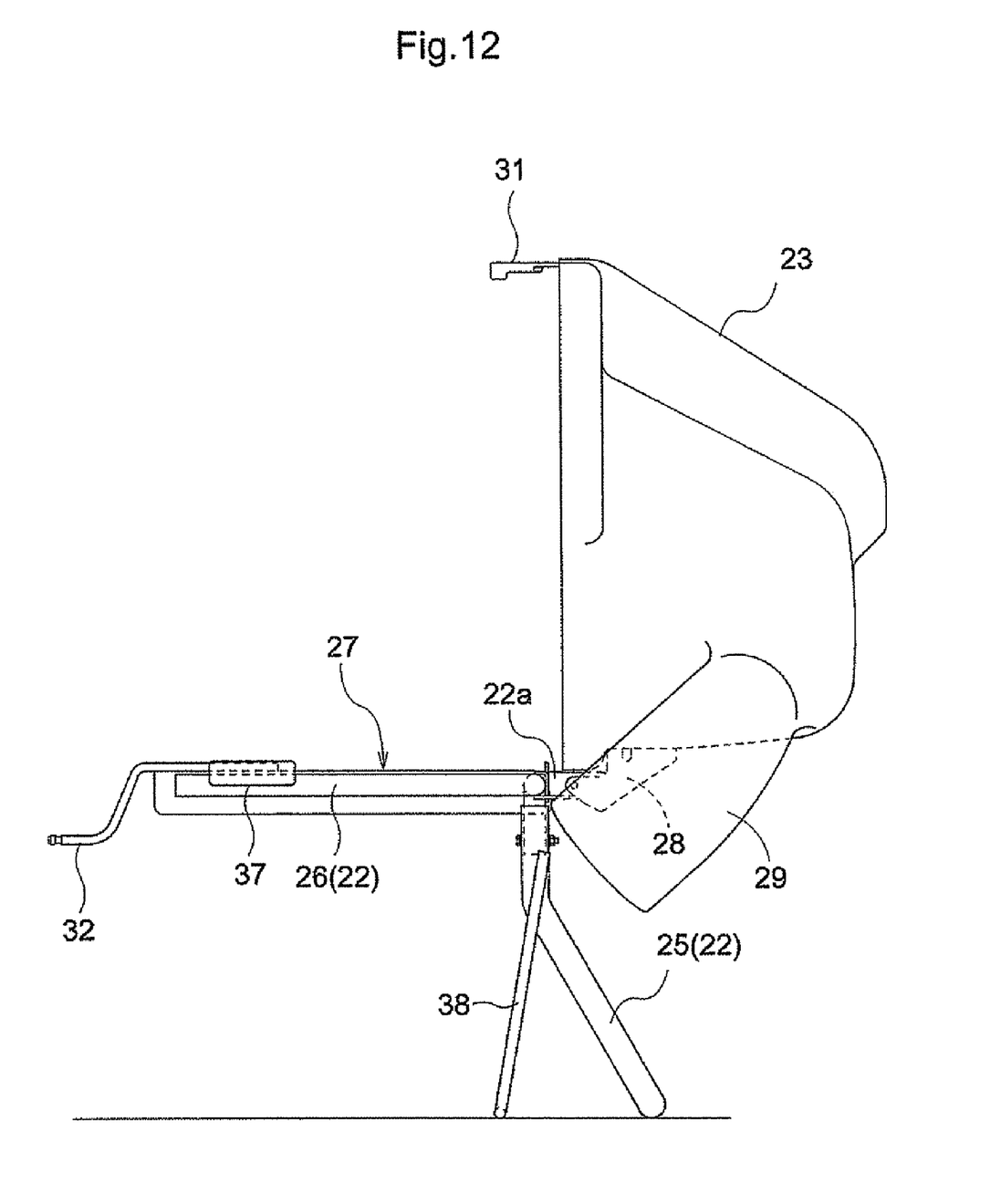
FIG. 12 is a side view of the apparatus using a stand.

As shown in FIGS. 7, 5 and 6, the container frame 22 includes a stand 38 connected to the strut 25. As shown in FIG. 12, the stand 38 allows the container frame 22 to stand on the ground with the strut 25 acting as a ground-contacting member when the container frame 22 is removed from the vehicle. As shown in FIG. 8, the stand 38 is positioned more forwardly of the grass collecting apparatus than the grass collecting containers 21 when the container frame 22 is attached to the vehicle, to allow a ground-contacting portion 38a of the stand 38 extending in the transverse direction of the grass collecting apparatus to support the grass collecting containers 21 so as to prevent the grass collecting containers 21 from swinging and contacting the rear wheels 2 when the vehicles starts or stops.

Modified Embodiment

Instead of the engaging members 35 formed on the connecting metal attachments 28, it is possible to employ a construction in which the engaging members 35 solely pinch the opening edges of the grass collecting containers 21 from the fore-and-aft direction of the vehicle to position the grass collecting containers 21.

What is claimed is:

1. A grass collecting apparatus for a lawn mower comprising:
   a frame supported by a vehicle body;
   a container supporting member for supporting a grass collecting container for storing grass clippings, the container supporting member including a container supporting surface for receiving an opening edge of the grass collecting container;
   a container cover mounted on the frame to be oscillatable about a horizontal axis between a closed position and an opened position, the container cover covering an opening of the grass collecting container supported by the container supporting member when in the closed position and opening the opening when in the opened position;
   an engaging member mounted on the container cover, the engaging member being engageable with the opening edge of the grass collecting container with oscillation of the container cover from the opened position to the closed position, thereby positioning and maintaining the grass collecting container on the container supporting member, and disengageable from the opening edge of the grass collecting container with oscillation of the container cover from the closed position to the opened position; and
   a connecting member for attaching the container cover to the frame to be oscillatable about the horizontal axis,
   wherein the engaging member is integrally formed on the connecting member.

2. The grass collecting apparatus as claimed in claim 1, wherein the frame extends rearward from the vehicle body,
   wherein the container supporting surface extends in a fore-and-aft direction of the vehicle body to allow the grass collecting container to slide on the container supporting surface in the fore-and-aft direction of the vehicle body; and
   wherein the engaging member is adapted to position the grass collecting container in the fore-and-aft direction of the vehicle body.

3. The grass collecting apparatus as claimed in claim 2, wherein the engaging member is adapted to pull the grass collecting container forward in the fore-and-aft direction of the vehicle body with oscillation of the container cover from the opened position to the closed position.

4. The grass collecting apparatus as claimed in claim 2, wherein the container supporting member includes a slide guide for guiding slide movement of the grass collecting container along the container supporting surface.

5. The grass collecting apparatus as claimed in claim 1, wherein the engaging member is formed as a hook-like engaging member engageable with the opening edge of the grass collecting container.

6. The grass collecting apparatus as claimed in claim 5, wherein a stopper is mounted on the container supporting member, and
   at the closed position, the opening edge of the grass collecting container is pinched between the hook-like engaging member and the stopper to position the grass collecting container relative to the container supporting member.

* * * * *